US008013231B2

(12) United States Patent
Fujishima et al.

(10) Patent No.: US 8,013,231 B2
(45) Date of Patent: Sep. 6, 2011

(54) SOUND SIGNAL EXPRESSION MODE DETERMINING APPARATUS METHOD AND PROGRAM

(75) Inventors: Takuya Fujishima, Hamamatsu (JP); Alex Loscos, Barcelona (ES); Jordi Bonada, Barcelona (ES); Oscar Mayor, Barcelona (ES)

(73) Assignee: Yamaha Corporation, Hamamatsu-shi (JP)

( * ) Notice: Subject to any disclaimer, the term of this patent is extended or adjusted under 35 U.S.C. 154(b) by 1099 days.

(21) Appl. No.: 11/439,818

(22) Filed: May 24, 2006

(65) Prior Publication Data

US 2006/0272488 A1 Dec. 7, 2006

(30) Foreign Application Priority Data

May 26, 2005 (JP) ................................ 2005-154738

(51) Int. Cl.
*G10H 1/02* (2006.01)
(52) U.S. Cl. ................. 84/626; 84/609; 84/615; 84/627
(58) Field of Classification Search .................... 84/626
See application file for complete search history.

(56) References Cited

U.S. PATENT DOCUMENTS

| 4,862,783 | A * | 9/1989 | Suzuki | 84/622 |
| 5,744,739 | A * | 4/1998 | Jenkins | 84/603 |
| 6,633,845 | B1 * | 10/2003 | Logan et al. | 704/255 |
| 2004/0231498 | A1 * | 11/2004 | Li et al. | 84/634 |
| 2005/0120868 | A1 * | 6/2005 | Hinman et al. | 84/615 |

FOREIGN PATENT DOCUMENTS

| JP | 03-242700 | 10/1991 |
| JP | 2001-117568 | 4/2001 |
| JP | 2001-117580 | 4/2001 |

OTHER PUBLICATIONS

Japanese Patent Office, Office Action for Patent Application No. 2006-146868, (Dated: Apr. 20, 2009; 5 pgs.).
European Patent Office, "European Search Report," (Sep. 1, 2006).
Arshia Cont, "Improvement of Observation Modeling for Score Following," Schwarz and Schnell (Paris), (Jun. 30, 2004).
Arshia Cont, et al., "Training ICRAM's Score Follower," XP007900990, IRCAM (Paris), (2004).

(Continued)

*Primary Examiner* — Elvin G Enad
*Assistant Examiner* — Christopher Uhlir
(74) *Attorney, Agent, or Firm* — Pillsbury Winthrop Shaw Pittman LLP

(57) ABSTRACT

A sound signal processing apparatus which is capable of correctly detecting expression modes and expression transitions of a song or performance from an input sound signal. A sound signal produced by performance or singing of musical tones is input and divided into frames of predetermined time periods. Characteristic parameters of the input sound signal are detected on a frame-by-frame basis. An expression determining process is carried out in which a plurality of expression modes of a performance or song are modeled as respective states, the probability that a section including a frame or a plurality of continuous frames lies in a specific state is calculated with respect to a predetermined observed section based on the characteristic parameters, and the optimum route of state transition in the predetermined observed section is determined based on the calculated probabilities so as to determine expression modes of the sound signal and lengths thereof.

7 Claims, 8 Drawing Sheets

OTHER PUBLICATIONS

C. Raphael, "Automatic Transcription of Piano Music," Automatic Transcription of Piano Music, University of Massachusetts (Amherst/USA), (Oct. 13, 2002).

Nicola Oria, et al., "Score Following: State of the Art and New Developments," Proceedings of the 2003 Conference on New Interfaces for Musical Expression (NIME-03), NIME (Montreal, Canada), p. 36-41, (May 22, 2003).

Pedro Cano, et al., "Score-Performance Matching using HMMs," Proceedings of ICMC99, Audiovisual Institute (Barcelona, Spain), (Oct. 1999).

Nicola Orio, et al., "Score Following Using Spectral Analysis and Hidden Markov Models," Proceedings of the ICMC 2001, p. 1-5, (Sep. 18, 2001).

* cited by examiner

FIG.7
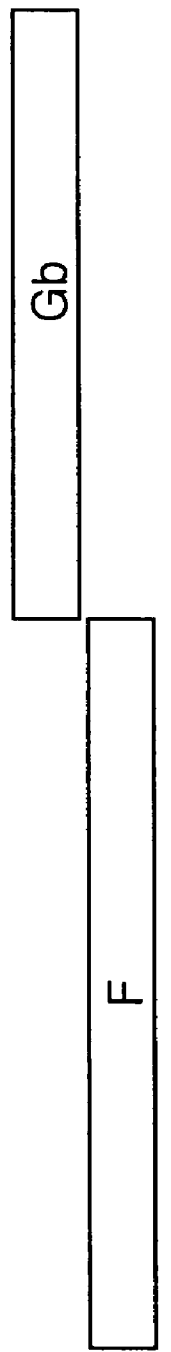
REFERENCE MELODY DATA
MUSICAL TONE
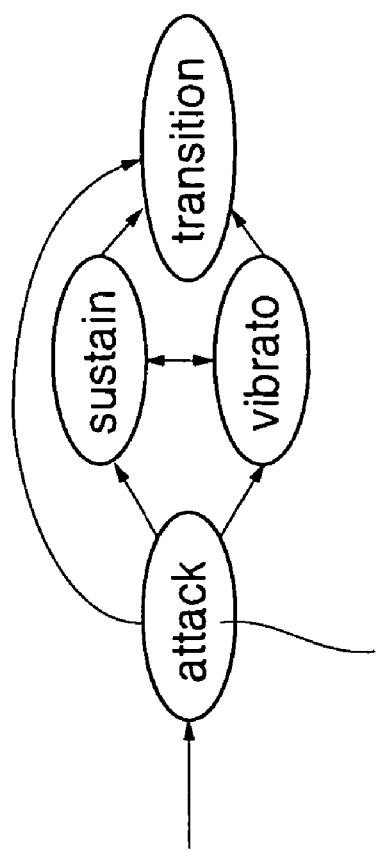
EXPRESSION TRANSITION MODEL
DURATION AND LABEL ARE UNKNOWN

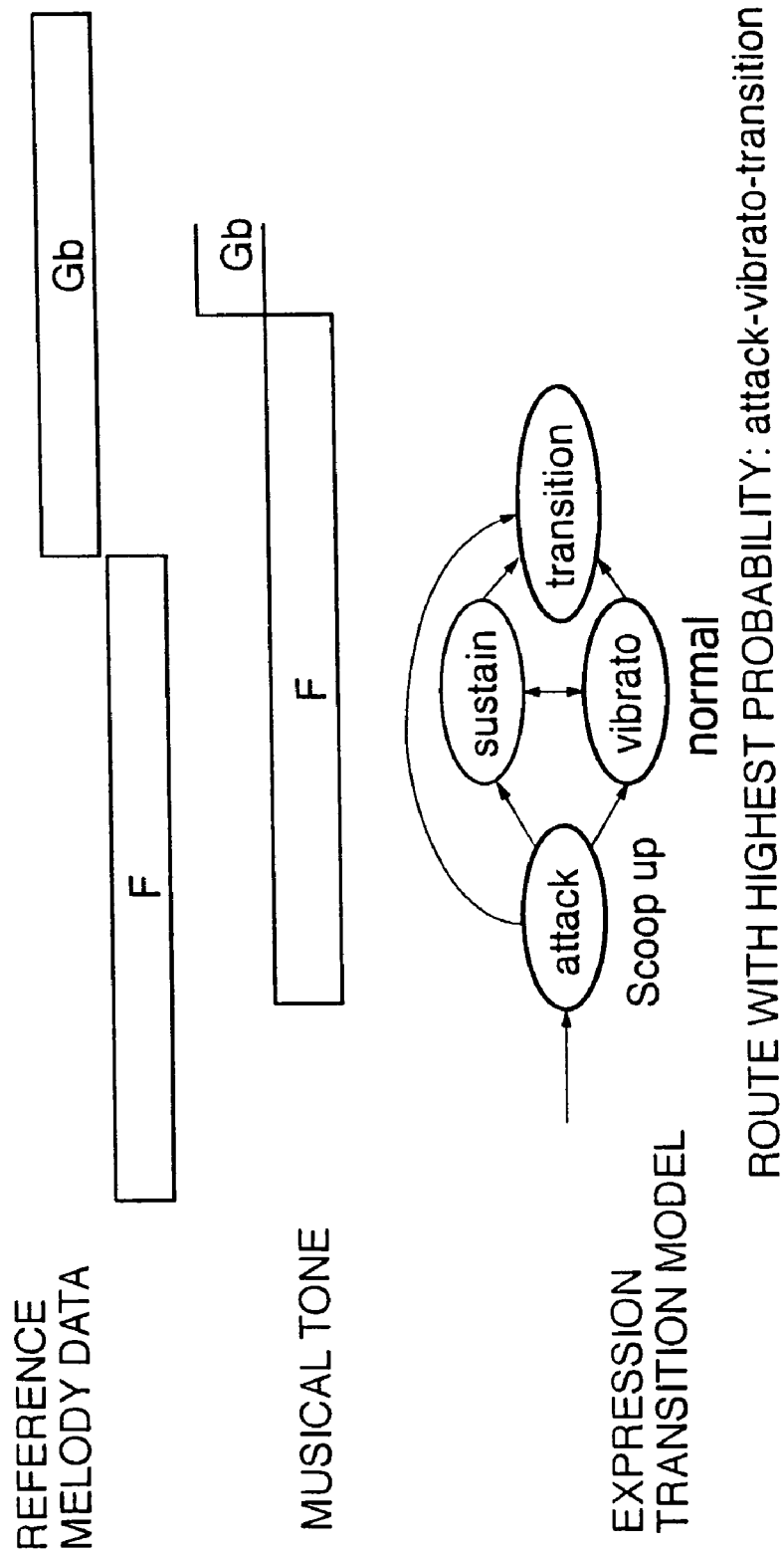

SOUND SIGNAL EXPRESSION MODE DETERMINING APPARATUS METHOD AND PROGRAM

BACKGROUND OF THE INVENTION

1. Field of the Invention

The present invention relates to a sound signal processing apparatus and a sound signal processing method which detect expression modes of a performance or song input as a sound signal, and a sound signal processing program for implementing the method.

2. Description of the Related Art

Conventionally, a variety of music evaluating apparatuses have been proposed which compare musical tone data such as song information or performance data with reference melody data to determine the beginning, continuation, and end of a tone (see Japanese Laid-Open Patent Publication (Kokai) No. H03-242700, for example).

Such music evaluating apparatuses are capable of determining whether or not tones of an input performance or song are correct on a one-by-one basis since the tones of the input performance or song are compared with reference melody data on a one-by-one basis.

In the above determination, however, expression modes and expression transitions of the input performance or song are not taken into consideration, and hence it is impossible to determine whether or not the input performance or song as a whole correctly reflects predetermined expression modes and expression transitions of a performance or song.

SUMMARY OF THE INVENTION

It is an object of the present invention to provide a sound signal processing apparatus and a sound signal processing method which are capable of correctly detecting expression modes and expression transitions of a song or performance from an input sound signal, as well as a sound signal processing program for implementing the method.

To attain the above object, in a first aspect of the present invention, there is provided a sound signal processing apparatus comprising a sound signal input device that inputs a sound signal produced by performance or singing of musical tones, a characteristic parameter detecting device that divides the input sound signal into frames of predetermined time periods and detects characteristic parameters of the input sound signal with respect to each frame, and an expression determining device that carries out an expression determining process in which a plurality of expression modes of a performance or song are modeled as respective states, a probability that a section including a frame or a plurality of continuous frames lies in a specific state is calculated with respect to a predetermined observed section based on the characteristic parameters of the frames, an optimum route of state transition in the predetermined observed section is determined based on the calculated probabilities so as to determine expression modes of the sound signal and lengths of the expression modes.

With the arrangement of the first aspect of the present invention, expression modes and expression transitions of a song or performance can be correctly detected from an input sound signal. As a result, a karaoke machine, for example, can score singing more correctly.

Preferably, in the expression determining process, the expression determining device further determines detailed contents of the expression modes based on the characteristic parameters with respect to sections in which the expression modes have been determined.

Preferably, the sound signal processing apparatus comprises a buffer that stores the characteristic parameters detected by the characteristic parameter detecting device, and the expression determining device carries out the expression determining process with respect to part of a musical composition during performance of the musical composition, and the buffer has a storage capacity for storing the part of the musical composition.

Preferably, the expression determining device detects transition points of the musical tones in the input sound signal and carries out the expression determining process at the transition points.

Preferably, the expression determining device determines the optimum route using a Viterbi algorithm.

To attain the above object, in a second aspect of the present invention, there is provided a sound signal processing method comprising a sound signal input step of inputting a sound signal produced by performance or singing of musical tones, a characteristic parameter detecting step of dividing the input sound signal into frames of predetermined time periods and detecting characteristic parameters of the input sound signal with respect to each frame, and an expression determining step of carrying out an expression determining process in which a plurality of expression modes of a performance or song are modeled as respective states, a probability that a section including a frame or a plurality of continuous frames lies in a specific state is calculated with respect to a predetermined observed section based on the characteristic parameters of the respective frames, and an optimum route of state transition in the predetermined observed section is determined based on the calculated probabilities so as to determine expression modes of the sound signal and lengths of the expression modes.

With the arrangement of the second aspect of the present invention, the same effects can be obtained as in the first aspect.

To attain the above object, in a third aspect of the present invention, there is provided a sound signal processing program executable by a computer, comprising a sound signal input module for inputting a sound signal produced by performance or singing of musical tones, a characteristic parameter detecting module for dividing the input sound signal into frames of predetermined time periods and detecting characteristic parameters of the input sound signal with respect to each frame, and an expression determining module for carrying out an expression determining process in which a plurality of expression modes of a performance or song are modeled as respective states, a probability that a section including a frame or a plurality of continuous frames lies in a specific state is calculated with respect to a predetermined observed section based on the characteristic parameters of the respective frames, an optimum route of state transition in the predetermined observed section is determined based on the calculated probabilities so as to determine expression modes of the sound signal and lengths of the expression modes.

With the arrangement of the third aspect of the present invention, the same effects can be obtained as in the first aspect.

The above and other objects, features, and advantages of the invention will become more apparent from the following detained description taken in conjunction with the accompanying drawings.

BRIEF DESCRIPTION OF THE DRAWINGS

FIG. 7 is a diagram useful in explaining the expression determining process in the case where it is carried out in real time; and FIG. 8 is a diagram useful in explaining the expression determining process in the case where it is carried out in real time.

DETAILED DESCRIPTION OF THE PREFERRED EMBODIMENTS

A description will now be given of a karaoke machine to which a sound signal processing apparatus according to an embodiment of the present invention is applied with reference to the accompanying drawings. The karaoke machine inputs a singing sound signal (musical tone signal) produced by singing of a karaoke song and detects expression modes (expression types) such as vibrato and scoop from the musical tone signal.

Figure 1:
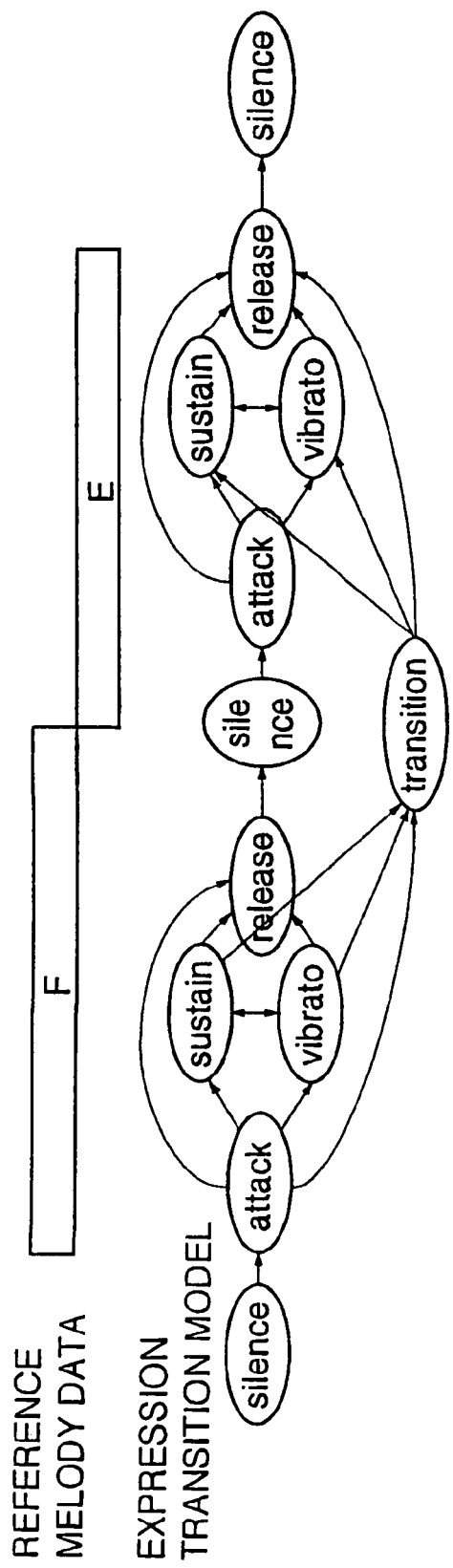
FIG. 1 is a diagram showing reference melody data and an expression transition model for use in an expression determining process according to the present invention.

In the present embodiment, a procedure described below is used to correctly detect a plurality of expression modes. Each of a plurality of expression modes is modeled as one state to formulate an expression transition model as a hidden Marcov model (HMM). FIG. 1 is a diagram showing this expression transition model. In the case where a musical note F which is illustrated as reference melody data is one observed section as shown in FIG. 1, seven expression modes (states) associated with this observed section are detected (i.e. silence, attack, sustain, vibrato, release, silence, and transition). In FIG. 1, however, expression modes are detected in sequence with respect to each note, and hence twelve expression modes (states) are shown. That is, the expression modes "silence" and "transition" between the musical notes F and E are common to the musical notes F and E.

Figure 2:
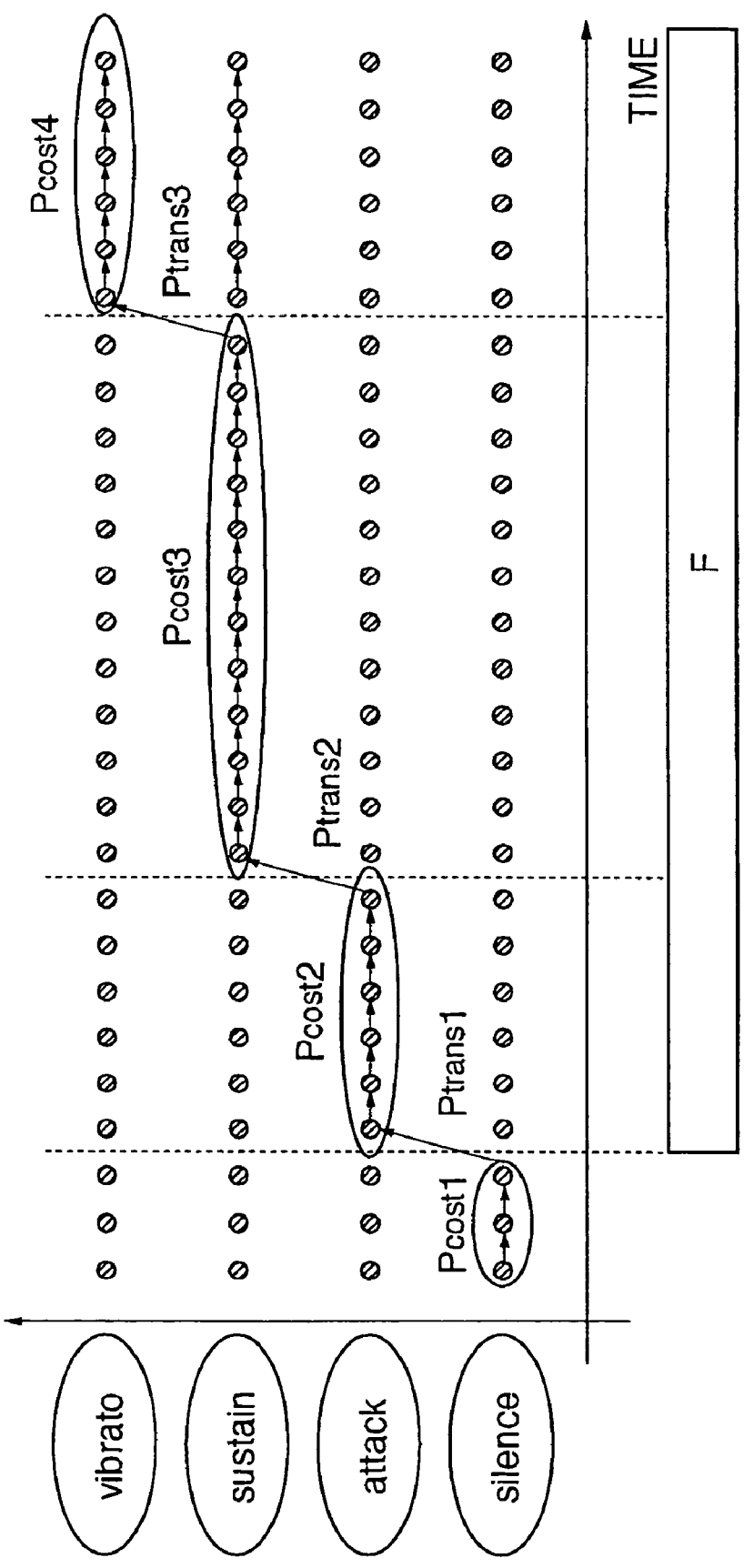
FIG. 2 is a diagram showing an example of state transition in an expression transition model in which states are arranged in the vertical direction and frames are arranged in time series order in the horizontal direction.

FIG. 2 is a diagram showing an example of state transition in an expression transition model in which states are arranged in the vertical direction and frames are arranged in time series order in the horizontal direction. In FIG. 2, the probability that each state (each expression mode) continues is expressed as the cost probability Pcost (n), and the route on which the product of cost probabilities of the respective states (logarithm sum) is the greatest is determined.

The cost probability is calculated by assigning expression mode determination rules to characteristic parameters included in respective frames from a specific frame to a subsequent specific frame. Further, the cost probability is calculated with respect to a combination of all the frames from a starting frame to an ending frame in each state, and the route on which the product of cost probabilities is largest may be selected.

In the present embodiment, however, the optimum route is searched for using the Viterbi algorithm, and hence it is unnecessary to calculate the cost probability for a combination of all the frames from a starting frame to an ending frame.

Figure 3:
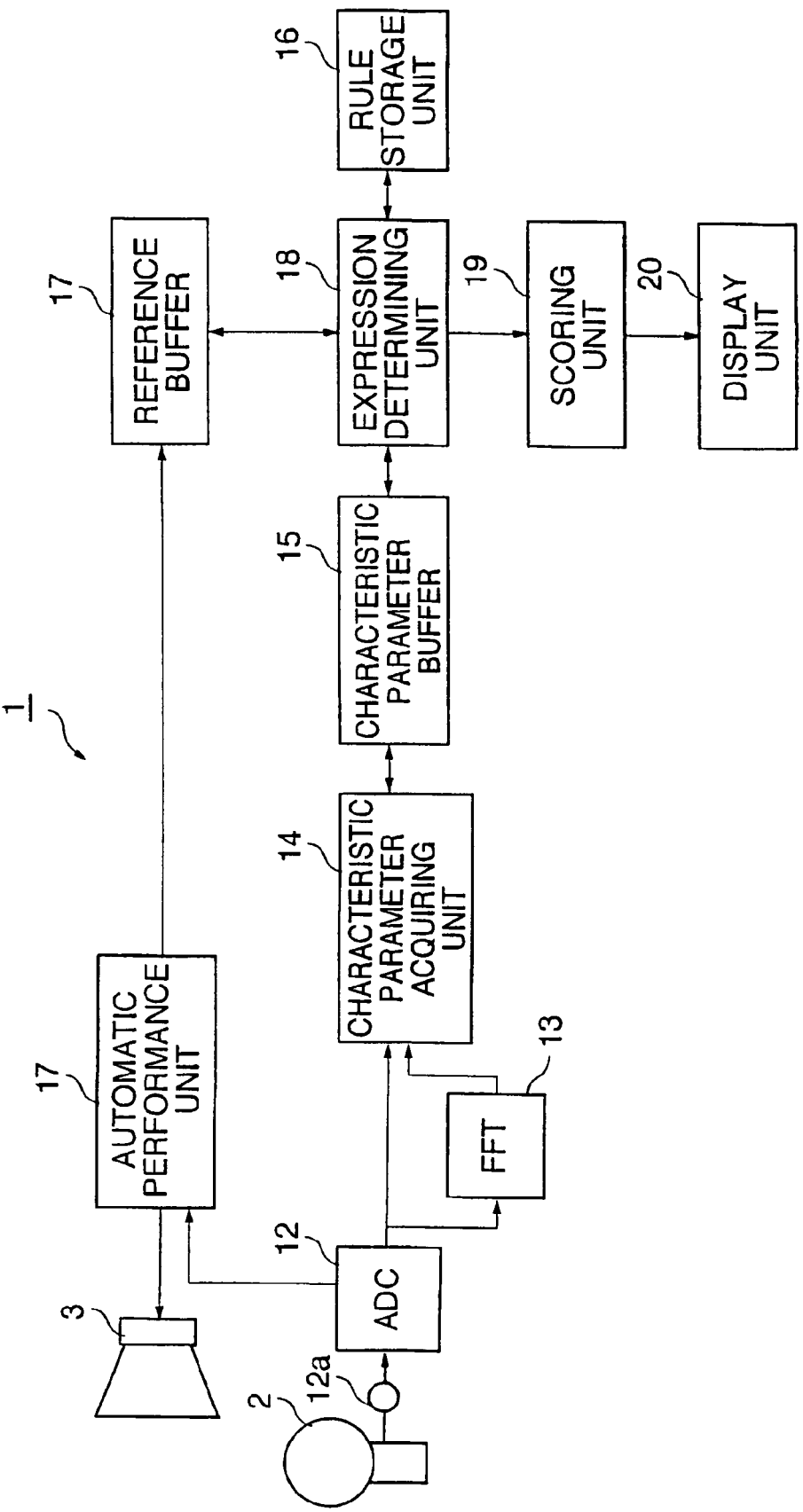
FIG. 3 is a block diagram schematically showing the construction of a karaoke machine as a sound signal processing apparatus.

FIG. 3 is a block diagram schematically showing the construction of the karaoke machine 1. A microphone 2 for collecting singing sounds produced by a person who is singing and a speaker 3 for sounding a musical composition performed in karaoke are connected to the karaoke machine 1.

The karaoke machine 1 is comprised of an automatic performance unit 11 for reproducing a karaoke musical composition, an A/D (analog-to-digital) converter 12 that digitalizes a singing sound signal input from the microphone 2, and an FFT processing unit 13, a characteristic parameter acquiring unit 14, a characteristic parameter buffer 15, a rule storage unit 16, a reference buffer 17, and an expression determining unit 18, which are functional units for detecting various expression modes from a digitalized singing sound signal (singing sound data).

The automatic performance unit 11 is comprised of a storage unit that stores karaoke musical composition data, a sequencer and a tone generator for performing the karaoke musical composition data, and so forth, as well as an operating unit that receives user's operations. The automatic performance unit 11 synthesizes a singing sound signal input from the microphone 2 through the A/D converter 12 and an automatically performed karaoke performance tones, and inputs the synthesis result to the speaker 3.

The A/D converter 12 converts an analog singing sound signal input from the microphone 2 connected to a connecting terminal 12a into digital data, and inputs the digital data to the FFT processing unit 13 and the characteristic parameter acquiring unit 14. The FFT processing unit 13 divides the input singing sound data as a sampling data string into data of 25 msec and carries out fast Fourier transformation. In the fast Fourier transformation, the sampling data string is multiplied by a window function so as to suppress an error spectrum caused by a limited time window. The frequency spectrum obtained by the FFT is input from the FFT processing unit 13 to the characteristic parameter acquiring unit 14.

The characteristic parameter acquiring unit 14 is implemented by, for example, a CPU. Singing sound data as a time-domain signal waveform is input directly from the A/D converter 12 to the characteristic parameter acquiring unit 14, and also a frequency spectrum which is information indicative of a frequency range is input from the FFT processing unit 13 to the characteristic parameter acquiring unit 14. The characteristic parameter acquiring unit 14 acquires a plurality of characteristic parameters indicative of various characteristics of singing sound from the input singing sound data and the input frequency spectrum. The acquisition of the characteristic parameters is carried out with respect to each frame of 25 msec.

Figure 4:
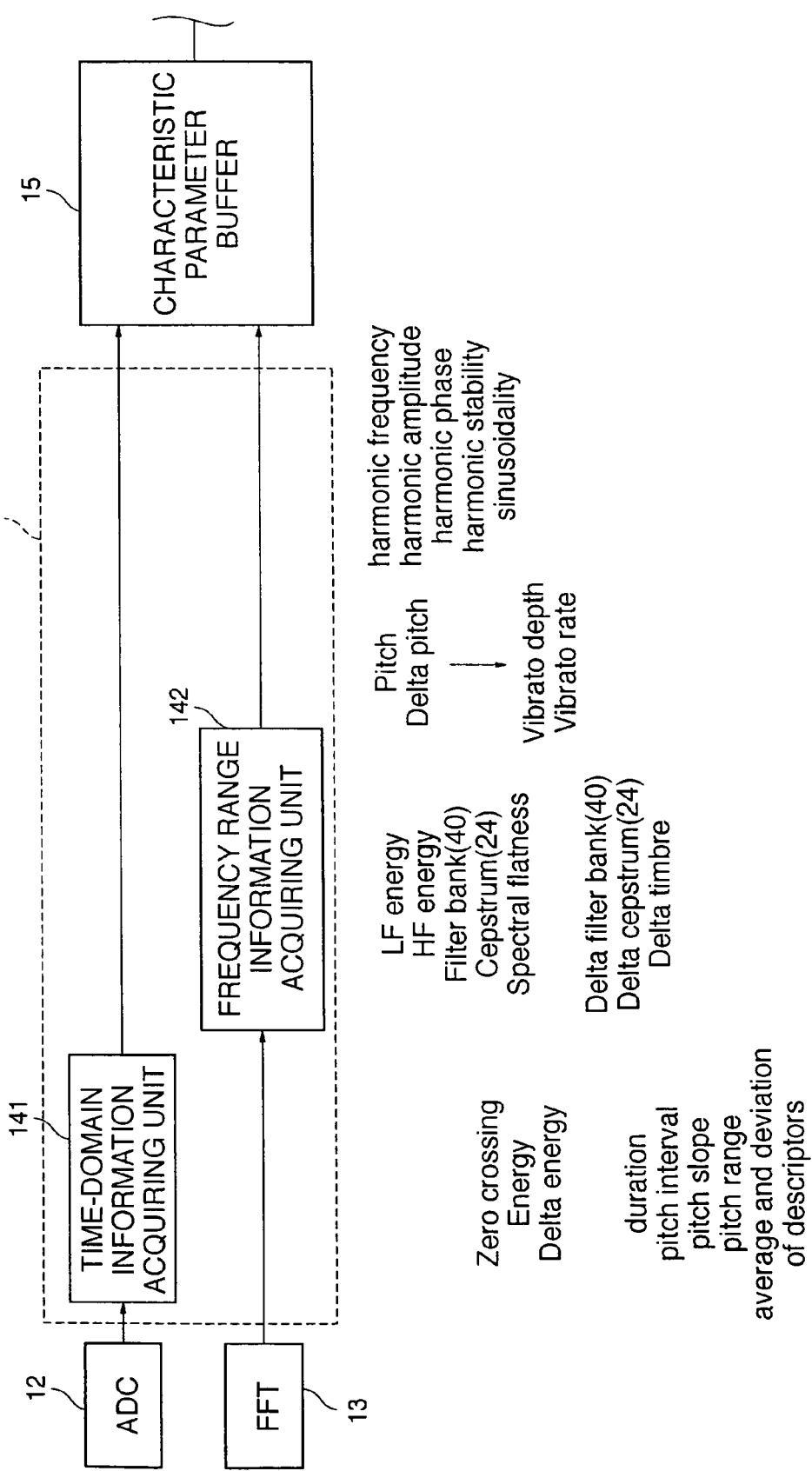
FIG. 4 is a block diagram showing in further detail the construction of a characteristic parameter acquiring unit of the karaoke machine.

FIG. 4 is a block diagram showing in further detail the construction of the characteristic parameter acquiring unit 14 appearing in FIG. 3. The characteristic parameter acquiring unit 14 is comprised of a time-domain information acquiring unit 141 that identifies time-domain characteristic parameters from singing sound data input from the A/D converter 12, and a frequency range information acquiring unit 142 that identifies frequency-range characteristic parameters from a frequency spectrum input from the FFT processing unit 13.

The time-domain information acquiring unit 141 divides input singing sound data into frames of 25 msec which are in synchronization with the above-mentioned processing carried out by the FFT processing unit 13 and acquires time-domain characteristic parameters with respect to each frame. Examples of the characteristic parameters acquired by the time-domain information acquiring unit 141 include:

Timing of zero crossing (Zero crossing);
Energy (Energy);
Change in energy (Delta energy);
Duration (Duration);
Pitch interval (Pitch interval);
Pitch slope (Pitch slope);
Pitch range (Pitch range); and
Pitch stability (Pitch stability).

The time-domain information acquiring unit 141 also acquires the mean and deviation of the above parameters when necessary. It should be noted that the words shown in parentheses represent words in FIG. 4.

The frequency-range information acquiring unit 142 acquires frequency-range characteristic parameters from a frequency spectrum of a waveform of 25 ms input from the FFT processing unit 13. Examples of the characteristic parameters acquired by the frequency-range information acquiring unit 142 include:

Low frequency energy (LF energy);
High frequency energy (HF energy);
Filter bank (40 elements) (Filter bank);
Cepstrum (24 elements) (Cepstrum);
Spectral flatness (Spectrum flatness);
Change in filter bank (Delta filter bank);
Change in cepstrum (Delta cepstrum);
Change in timbre (Delta timbre);
Pitch (Pitch);
Change in pitch (Delta pitch);
Vibrato depth (Vibrato depth);
Vibrato speed (Vibrato speed);
Harmonic frequency (Harmonic frequency);
Harmonic amplitude (Harmonic amplitude);
Harmonic phase (Harmonic phase);
Harmonic stability (Harmonic stability); and
Sinusoidality (Sinusoidality).

It should be noted that the words shown in parentheses represent words in FIG. 4

The pitch is acquired from the fundamental frequency of a sound signal, and the energy is acquired from the instantaneous value of the volume of a sound signal. Regarding the vibrato, changes in the energy and pitch with respect to time are approximated by a sine function; the frequency of the approximated sine wave is obtained as the vibrato rate, and the maximum amplitude of the approximated sine wave is obtained as the vibrato depth.

A change in timbre is a value indicative of a change between frames with regard to the value obtained by computing the inverse Fourier transform of the logarithm of an amplitude spectrum, and is also a parameter that expresses a change in frequency spectrum well. By using a change in timbre as a characteristic parameter in making a determination, described later, it is possible to reliably detect a change in sound caused by state transition. In particular, by using a characteristic parameter indicative of a change in timbre, it is possible to reliably detect a change in sound from "vowel sound" to "vowel sound", which would be difficult to detect if other characteristic parameters are used.

The characteristic parameters acquired by the time-domain information acquiring unit 141 and the frequency-range information acquiring unit 142 are input to the characteristic parameter buffer 15.

The characteristic parameter buffer 15 adds time information to the input characteristic parameters and stores them. The time information is indicative of positions on the time axes of frames which are the source data of the characteristic parameters. The characteristic parameter buffer 15 stores characteristic parameters of the latest several seconds and discards older characteristic parameters. The storage time period may be equivalent to about the length of a time period that a characteristic determining process, which is repeatedly carried out by the expression determining unit 18, described later, is carried out once. As a result, the characteristic parameter buffer 15 does not have to store characteristic parameters for the entire piece of music, and therefore can be effectively reduced in memory capacity.

The rule storage unit 16 stores various rules for use in the expression determining process carried out by the expression determining process unit 18. What kind of rules are stored in the rule storage unit 16 will be described later in the description of the expression determining unit 18.

Reference melody data which is in synchronization with the performance of a karaoke song (musical composition data) is input from the automatic performance unit 11 to the reference buffer 17. Guide melody data for guiding in singing may be used as the reference melody data. The reference buffer 17 stores part of the reference melody data which is equivalent in amount to about the length of a time period that the characteristic determining process repeatedly carried out by the expression determining unit 18, described later, is carried out once, and discards older data.

The expression determining unit 18 formulates an HMM by modeling expression models with respect to each tone of the reference melody data and determines how the expression mode changes in each tone. Each time an expression mode is determined, the expression determining unit 18 inputs expression mode information on the determined expression mode to a scoring unit 19. The expression mode information includes information indicative of the type of the expression mode and the timing of starting and ending of the expression mode.

The scoring unit 19 receives the expression mode information from the expression determining unit 18 and also receives the reference melody data from the automatic performance unit 11. The scoring unit 19 positions the input expression mode information on the reference melody data to determine a position at which the expression mode has been affected in singing, and scores singing based on the determination result. The scoring unit 19 scores singing, for example, based on a scale of 100, and inputs the scoring result to the display unit 20. The display unit 20 displays the scoring result for the person who sings. This scoring process may be carried out in real time with respect to each short singing interval (for example, 10 seconds) or may be carried out with respect to the entire karaoke song after it is completed. Alternatively, the scoring process may be carried out in real time with respect to each short singing interval and also carried out after the completion of singing to evaluate singing comprehensively.

A description will now be given of the expression determination process carried out by the expression determining unit 18. In the expression determining process, with respect to each tone in reference melody data, expression modes (expression types) as states of an HMM, which are included in the tone, and expression labels (detailed characteristics) indicative of more detailed characteristics of the expression modes are determined. The expression modes and the expression labels (in parentheses) of the respective expression modes determined by the expression determining unit 18 are as follows:

Attack (normal/scoop up/scoop fry);
Sustain (normal, fall down);
Vibrato (normal);
Release (normal, and fall down); and
Transition (normal, portamento, scoop up/down, staccato).

The expression determining unit 18 generates an expression transition model for use in determining how the expression mode changes with respect to each tone of reference melody data as mentioned above. FIG. 1 referred to above is a diagram showing an example of this expression transition model.

In the expression determining unit 18, conditions on which the expression mode changes in one tone are registered in advance, and the expression determining unit 18 generates an expression transition model as shown in FIG. 1 based on the conditions.

Examples of the conditions include "a tone after a silence always begins with an attack", "transition from a state other than a state of silence to an attack never takes place", "the last tone of a phrase, i.e. a tone immediately before silence always ends with a release", and "transition from a release to a state other than a silence never takes place." The expression mode changes in two possible ways between continuous two tones: one is "release→silence→attack", and the other is "transition." It should be noted that one tone may have in midstream the following expression modes, sustain and vibrato.

It should be noted that although the expression transition model for two tones is illustrated in FIG. 1, the expression determining unit 18 generates an expression transition model for one tone or a plurality of tones belonging to an observed section in each determination cycle by connecting expression modes by "silence" and "transition."

The expression determining unit 18 may repeatedly carry out the expression determining process in arbitrary timing. By carrying out the expression determining process in the transition timing of tones in reference melody data, the expression determining unit 18 can determine how the expression mode changes over at least two tones. In this case, the length of a section to be observed in one expression determining process may be about one second before and one second after the transition timing, i.e. two seconds in total.

In FIG. 1, state transition starts with a silence at the left end, and sounding always starts with an attack. The direction of the state transition is indicated by the arrows. Thus, a musical tone starting with an attack can make a plurality of types of transitions as follows:

End with a release through one or both of sustain and vibrato (normal singing).
After an attack, make a transition directly to a release and end (singing like popping).
Lead to the next musical tone through a transition from an attack, a sustain or a vibrato (legato, portamento, etc.).

The expression determining unit 18 determines expression mode transitions and transition timing thereof with the highest probability with respect to the entire observed section by determining an expression mode of a section including one frame or a plurality of continuous frames and determining whether or not the section including the frame or frames is suitable as a section from the start timing to the end timing of the expression mode (i.e. the probability that the length of the section is suitable).

Thus, determination rules as well are not such that characteristic parameters are evaluated on a frame-by-frame basis, but describes what types of characteristics (trends) a row of continuous frames exhibits when the probability that it is determined that the continuous frames are in a certain expression mode is increased. The probability value is expressed by a real value of 0.0 to 1.0.

It is reasonable to use the following Gaussian distribution, Gaussian (mean, var)=$\exp(-0.5*((\text{mean}-x)/\text{var})^2)$, to set a determination rule since errors in measurement required for the determination often have a Gaussian distribution. Alternatively, from the standpoint of saving the volume of calculation, a determination rule may be expressed by, for example, a broken line (approximate straight line) or may be expressed according to a fuzzy logic. Still alternatively, a determination rule may be established by a piecewise combination of the Gaussian distribution, the broken line (approximate straight line), and the fuzzy logic.

Further, the final probability may be obtained by combining probabilities obtained by a plurality of rules. To this end, for example, probabilities obtained by respective rules are multiplied together.

The determination rules described below are heuristic rules based on common sense and empirical rules by a person, but may be obtained by mechanical learning.

Determination rules regarding the silence
The probability is decreased according to the proportion of unsilent frames relative to all the frames.
This means that a probability distribution such as a Gaussian distribution with a mean value 0 is prescribed with respect to the proportion of unsilent frames relative to all the frames, and a probability corresponding to the proportion of unsilent frames measured from an input sound is obtained.
When there are three or more unsilent frames among ten frames from the first ten frames (the first half of all the frames when there are not 10 frames), the probability is decreased. This means that a probability distribution such as a Gaussian distribution with a mean value "3" is prescribed with respect to the numbers of unsilent frames included in the first ten frames, and a probability corresponding to the measured value of unsilent frames is obtained.
When there are three or more unsilent frames among ten frames from the last to tenth frames (the last half of all the frames when there are not ten frames), the probability is decreased. This means that a probability distribution such as a Gaussian distribution with a mean value "3" is prescribed with respect to numbers of unsilent frames included in the last ten frames, and a probability corresponding to the measured number of unsilent frames is obtained.

The above three probabilities are multiplied together, and the calculation result is regarded as the cost probability of the silent mode.

Determination rules regarding the attack
Duration
When the length of an unsilent section as an object of determination is shorter than a threshold value set in advance, it is determined that the probability is low.
For example, in the case where 6 (frames) is set as the threshold value, and calculation is performed such that the probability is set to 1.0 when the length of the unsilent section is longer than 6 frames and is set to Gaussian (6, 1.8) when the length of the unsilent section is shorter than six frames.
Pitch
A pitch exists in the last frame in a section as an object of determination (hereinafter referred to as "determination section").

In this case, the probability distribution takes on a value "1" or "0." That is, if this condition is satisfied, the probability is 1.

Energy

Energy is low at the leading end of the determination section.

The increment of energy is large at the leading end of the determination section.

The increment of energy is small at the trailing end of the determination section.

This means that a probability distribution such as a Gaussian is prescribed with respect to energy values, and a probability corresponding to the measured value is obtained. If each condition is satisfied, each probability increases.

It should be noted that the leading end means first several frames, and the trailing end means last several frames. The same will apply hereinafter.

The degree of change in pitch

The degree of change in pitch is small at the trailing end of the determination section.

This means that a probability distribution such as a Gaussian is prescribed with respect to the degrees of change in pitch, and a probability corresponding to the measured value is obtained. If this condition is satisfied, the probability increases.

The degree of change in timbre

The degree of change in timbre is high at the leading end of the determination section.

This means that a probability distribution such as a Gaussian is prescribed with respect to degrees of change in timbre, and a probability corresponding to the measured value is obtained. If this condition is satisfied, the probability increases.

Vibrato

No vibrato exists in the determination section.

In this case, the probability distribution takes on a value "1" or "0." That is, if this condition is satisfied, the probability is 1.

A plurality of probabilities calculated regarding the duration, pitch, energy, degree of change in pitch, degree of change in timbre, and vibrato are multiplied together, and the calculation result is regarded as the cost probability of the attack mode.

Rules for labeling the expression of attack (normal/scoop-fry/scoop-up)

When the degree of change in pitch is small at the leading end of the determination section, the expression mode of an attack is labeled as "normal."

When the degree of change in pitch is large at the leading end of the determination section, the expression mode of an attack is labeled as follows:

When the number of unsilent frames is small at the leading end of a section as an object of determination, the expression mode of an attack is labeled as scoop-fry (scoop from very faint utterance).

When the number of unsilent frames is large at the leading end of a section as an object of determination, the expression mode of an attack is labeled as scoop-up (scoop from normal utterance).

Determination rules regarding the release

Duration

When the length of an unsilent section as an object of determination is shorter than a threshold value set in advance, it is determined that the probability is low.

For example, in the case where 4 (frames) is set as the threshold value, and it is determined that the probability is 1.0 when the length of the unsilent section is longer than four frames, and is Gaussian (4, 1.2) when the length of the unsilent section is shorter than four frames.

In general, as the length of an unsilent section increases, the probability that the expression mode is determined as being "release" decreases.

To express this, Gaussian (0, c) (c is the number of frames corresponding to two seconds; e.g. 80 in the case where 40 frames are processed per second) is used, for example.

Pitch

Pitches exist in a preceding section immediately before the determination section, i.e., in the last two frames in the preceding section. In this case, the probability distribution takes on a value "1" or "0." That is, if this condition is satisfied, the probability is 1. On the other hand, when no pitch exists in the last two frames, the probability is 0.

Energy

Energy is low at the trailing end of the determination section.

Energy considerably decreases at the trailing end of the determination section.

The increment of energy is small at the leading end of the determination section.

Energy increases with a low frequency during the determination section.

This means that a probability distribution such as a Gaussian is prescribed with respect to energy values, and a probability corresponding to the measured value is obtained. If each condition is satisfied, each probability increases.

The degree of change in pitch

The degree of change in pitch is small at the leading end of the determination section.

This means that a probability distribution such as a Gaussian is prescribed with respect to degrees of change in pitch, and a probability corresponding to the measured value is obtained. If this condition is satisfied, the probability increases.

The degree of change in timbre

The degree of change in timbre is large at the trailing end of the determination section.

This means that a probability distribution such as a Gaussian is prescribed with respect to degrees of change in timbre, and a probability corresponding to the measured value is obtained. If this condition is satisfied, the probability increases.

Harmonic stability

The harmonic stability is low at the leading end of the determination section.

This means that a probability distribution such as a Gaussian is prescribed with respect to degrees of change in timbre, and a probability corresponding to the measured value is obtained. If this condition is satisfied, the probability increases.

Vibrato

The vibrato is small in the determination section (the speed of vibrato is low, and the depth of vibrato is small).

This means that a probability distribution such as a Gaussian is prescribed with respect to vibrato values (vibrato speeds and vibrato depths), and a probability corresponding to the measured value is obtained. If this condition is satisfied, the probability increases.

A plurality of probabilities calculated regarding the duration, pitch, energy, degree of change in pitch, degree of change in timbre, harmonic stability, and vibrato are multiplied together, and the calculation result is regarded as the cost probability of the release mode.

Rules for labeling the expression of release (fall-down)

To determine whether or not the expression label of the release is "fall-down", the probability that the expression of release is labeled as "fall-down" is calculated anew.

When the length of the determination section is smaller than the minimum value set in advance, it is determined that the expression level of the release is "normal", not "fall-down."

When the length of the determination section is greater than the minimum value set in advance, the process proceeds to the next determination step.

When a difference between the maximum pitch in the first half of the determination section and the minimum pitch in the last half of the determination section is small, there is a low possibility that the expression label of the release is "fall-down", and hence the probability that the expression of release is labeled as "fall-down" is decreased.

In the case where the approximate straight line of pitch is obtained with respect to the leading end (first frame) of the concerned section to an unsilent frame at the trailing end, there is a high possibility that the expression label of the release is "fall-down" if the gradient of the approximate straight line is negative, and hence the probability that the expression of release is labeled as "fall-down" is increased.

If, as a result, it is determined that the probability that the expression of release is labeled as "fall-down" is greater than a value set in advance, the concerned section is labeled as "fall-down", followed by termination of the process.

Determination rules regarding the transition

Duration

The length of an unsilent section as an object of determination is greater than the minimum value set in advance.

This means that a probability distribution such as a Gaussian is prescribed with respect to degrees of change in pitch, and a probability corresponding to the measured value is obtained. If this condition is satisfied, the probability increases.

Staccato

When a part (frame) which can be regarded as being unsilent exists in the first half of the determination section, this part is regarded as a staccato. The staccato is regarded as a transition type (not release→silence→attack)

Pitch

Pitches exist in the last two frames immediately before the leading end of the determination section, respectively.

A pitch exists in a first frame of the determination section.

A pitch exists in a last frame of the determination section.

In the case where two frames immediately after the frame at the leading end of the determination section can be referred to, pitches exist in these two frames, respectively.

In these cases, the probability distribution takes on a value "1" or "0." That is, if each condition is satisfied, each probability is 1.

Energy

Energy greater than the minimum value set in advance exists at both the leading end and trailing end of the determination section.

In this case as well, the probability distribution takes on a value "1" or "0." That is, if each condition is satisfied, each probability is 1.

Vibrato

The vibrato is small in the determination section (the speed of vibrato is low, and the depth of vibrato is small).

This means that a probability distribution such as a Gaussian is prescribed with respect to vibrato values (vibrato speeds and vibrato depths), and a probability corresponding to the measured value is obtained. If this condition is satisfied, the probability increases.

Harmonic stability

When the length of the determination section is smaller than the minimum value set in advance, and the harmonic stability is low at the leading end of the determination section, the probability is decreased.

When the length of the determination section is greater than the minimum value set in advance, and the harmonic stability is high at the trailing end of the determination section, the probability is decreased.

When the harmonic stability has continued to be high for a long period of time, and there is no staccato in the determination section, the probability is decreased.

This means that a probability distribution such as a Gaussian is prescribed with respect to harmonic stability values, and a probability corresponding to the measured value is obtained. If each condition is satisfied, each probability increases.

Interval

The average pitch is obtained with respect to each of a tone before transition and a tone after transition, which are assumed to exist in the determination section, and the difference in pitch between the two tones is calculated.

The value thus calculated is compared with the difference in pitch between the corresponding two tones in reference melody information. The closer they are, the higher the probability is.

The degree of change in pitch

The degree of change in pitch is small at both ends of the determination section.

This means that a probability distribution such as a Gaussian is prescribed with respect to degrees of change in pitch, and a probability corresponding to the measured value is obtained. If this condition is satisfied, the probability increases.

A plurality of probabilities calculated regarding the duration, pitch, energy, vibrato, harmonic stability, interval, and degree of change in pitch are multiplied together, and the calculation result is regarded as the cost probability of the transition mode.

Calculations for labeling the transition and calculation of final result

Whether or not the expression of transition is "scoop-up" is determined by separately calculating the probability as described below.

The length of a tone after transition is smaller than the minimum value set in advance, or the length of the tone after transition is greater than the minimum value set in advance and a section in which the pitch is stable exists in a beginning part of the tone after transition.

A difference between the average pitch of the entire determination section and the pitch at the trailing end of the determination section is not less than a half step.

There is no pitch deviation of 60 or more from the beginning to the position at which the pitch becomes stable in a tone after transition.

The stability is low at the trailing end of the determination section.

The vibrato is small at the trailing end of the determination section.

If each condition is satisfied, each probability increases. A plurality of probabilities thus calculated are multiplied together, and if the calculation result is greater than the minimum value set in advance, the expression of transition is labeled as "scoop-up."

Whether or not the expression of transition is "portamento" is determined by separately calculating the probability as described below.

The length of a tone before transition is greater than the minimum value set in advance.

The stability is high in a tone after transition.

The degree of change in pitch is large in a tone before transition.

A change in pitch is a half step or more in a tone before transition.

When a silent frame exists in a tone before transition, the probability is decreased.

If each condition is satisfied, each probability increases. A plurality of probabilities thus calculated are multiplied together, and if the calculation result is greater than the minimum value set in advance, the expression of transition is labeled as "portamento."

In the case where, as a result of the above determinations, the expression of transition is "normal", not "scoop-up" or "portamento", the expression of transition is labeled as follows:

If the degree of change in pitch is greater than a positive value set in advance and there is a staccato, the expression of transition is labeled as "staccato-normal-up", and if not, the expression of transition is labeled as "normal-up."

If the degree of change in pitch is smaller than a positive value set in advance and there is a staccato, the expression of transition is labeled as "staccato-normal-down", and if not, the expression of transition is labeled as "normal-down."

If not, the expression of transition is labeled as "normal-down."

Determination rules regarding the sustain

Duration

When the length of an unsilent section as an object of determination is smaller than a threshold value set in advance, it is determined that the probability is low.

This means that a probability distribution such as a Gaussian is prescribed with respect to duration values, and a probability corresponding to the measured value is obtained. If this condition is satisfied, the probability increases.

Pitch

A pitch exists in the first frame of the determination section.

A pitch exists in the last frame of the determination section.

In the case where two frames immediately after the last frame of the determination section can be referred to, pitches exist in these two frames, respectively.

In these cases, the probability distribution takes on a value "1" or "0." That is, if each condition is satisfied, each probability is 1.

The degree of change in pitch

The degree of change in pitch is small at the leading end of the determination section.

This means that a probability distribution such as a Gaussian is prescribed with respect to degrees of change in pitch, and a probability corresponding to the measured value is obtained. If this condition is satisfied, the probability increases.

Energy

The value of energy is greater than the minimum value set in advance.

The value of energy is stable.

This means that a probability distribution such as a Gaussian is prescribed with respect to energy values, and a probability corresponding to the measured value is obtained. If each condition is satisfied, each probability increases.

The degree of change in timbre

The degree of change in timbre lies inside a range set in advance.

This means that a probability distribution such as a Gaussian is prescribed with respect to degrees of change in timbre, and a probability corresponding to the measured value is obtained. If this condition is satisfied, the probability increases.

Vibrato

The vibrato is small in the determination section.

In this case, the probability distribution takes on a value "1" or "0." That is, if this condition is satisfied, the probability is 1.

A plurality of probabilities calculated regarding the duration, pitch, degree of change in pitch, energy, degree of change in timbre, and vibrato are multiplied together, and the calculation result is regarded as the cost probability of the sustain mode.

Rules for labeling the expression of sustain

The expression of sustain is labeled only as "normal", but the probability that the expression of sustain is "normal" is calculated under the following rules and reflected on the final result.

The pitch is stable.

The gradient of an approximate straight line of pitch is approximately zero in the entire determination section.

Determination rules regarding vibrato

Duration

When the length of an unsilent section as an object of determination is smaller than a threshold value set in advance, it is determined that the probability is low.

This means that a probability distribution such as a Gaussian is prescribed with respect to duration values, and a probability corresponding to the measured value is obtained. If this condition is satisfied, the probability increases.

Pitch

A pitch exists in the first frame of the determination section.

A pitch exists in the last frame of the determination section.

In the case where two frames immediately after the last frame of the determination section can be referred to, pitches exist in these two frames, respectively.

In these cases, the probability distribution takes on a value "1" or "0." That is, if each condition is satisfied, each probability is 1.

Energy

The value of energy is greater than the minimum value set in advance.

This means that a probability distribution such as a Gaussian is prescribed with respect to energy values, and a probability corresponding to the measured value is obtained. If this condition is satisfied, the probability increases.

The degree of change in timbre

The degree of change in timbre lies inside a range set in advance.

In this case, the probability distribution takes on a value "1" or "0." That is, if this condition is satisfied, the probability is 1.

The degree of change in pitch

The maximum degree of change in pitch, which is obtained in the determination section, is greater than a lower limit value set in advance.

The maximum degree of change in pitch, which is obtained in the determination section, is smaller than an upper limit value set in advance.

In these cases, the probability distribution takes on a value "1" or "0." That is, if each condition is satisfied, each probability is 1.

Vibrato

The vibrato is large in the determination section.

This means that a probability distribution such as a Gaussian is prescribed with respect to vibrato values, and a probability corresponding to the measured value is obtained. If this condition is satisfied, the probability increases.

A plurality of probabilities calculated regarding the duration, pitch, energy, degree of change in timbre, degree of change in timbre, and vibrato are multiplied together, and the calculation result is regarded as the cost probability of the vibrato mode.

Next, a description will be given of a method to determine expression modes and search for the optimum route by which the expression mode changes.

Figure 6:
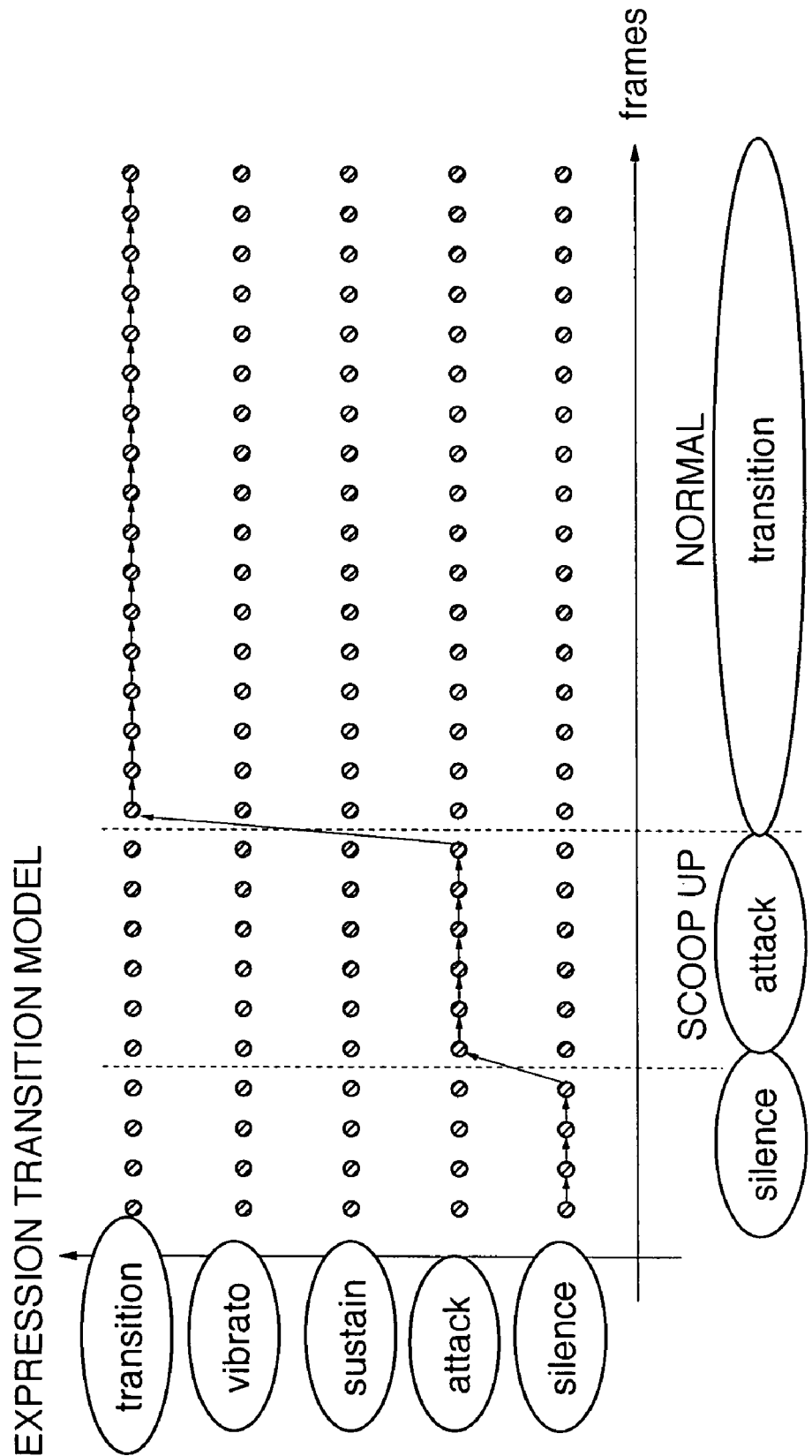
FIG. 6 is a diagram useful in explaining the expression determining process.

FIG. 6 is a diagram showing a state in which the optimum route of expression transition, which is searched for using the Viterbi algorithm, is written on a lattice. The probability at each nodal point (frame) provides the optimum route from the beginning of performance to the nodal point. It is assumed here that there are two probabilities: one is transition probability Ptrans, and the other is cost probability Pcost. In the present embodiment, for easy calculation, it is assumed that the transition probability Ptrans with respect to all the branches is 1 at all the nodal points. Thus, the probability as a whole depends only on the cost probability Pcost.

Since the transition probability at all the nodal points is 1, the probability of, for example, the route shown in FIG. 2 is expressed by:

$$P=Pcost(1)\ Pcost(2)\ Pcost(3)\ Pcost(4).$$

As probabilities that a certain state continues in a row of 0 to n frames preceding to an end frame where it is assumed that a frame at each nodal point (frame) is the end frame, n cost possibilities are given. The cost probability is obtained as a product of probabilities of all the above described rules.

After analysis of the entire observed section, backtracking of the viterbi matrix is carried out to determine a route with the highest probability.

Figure 5:
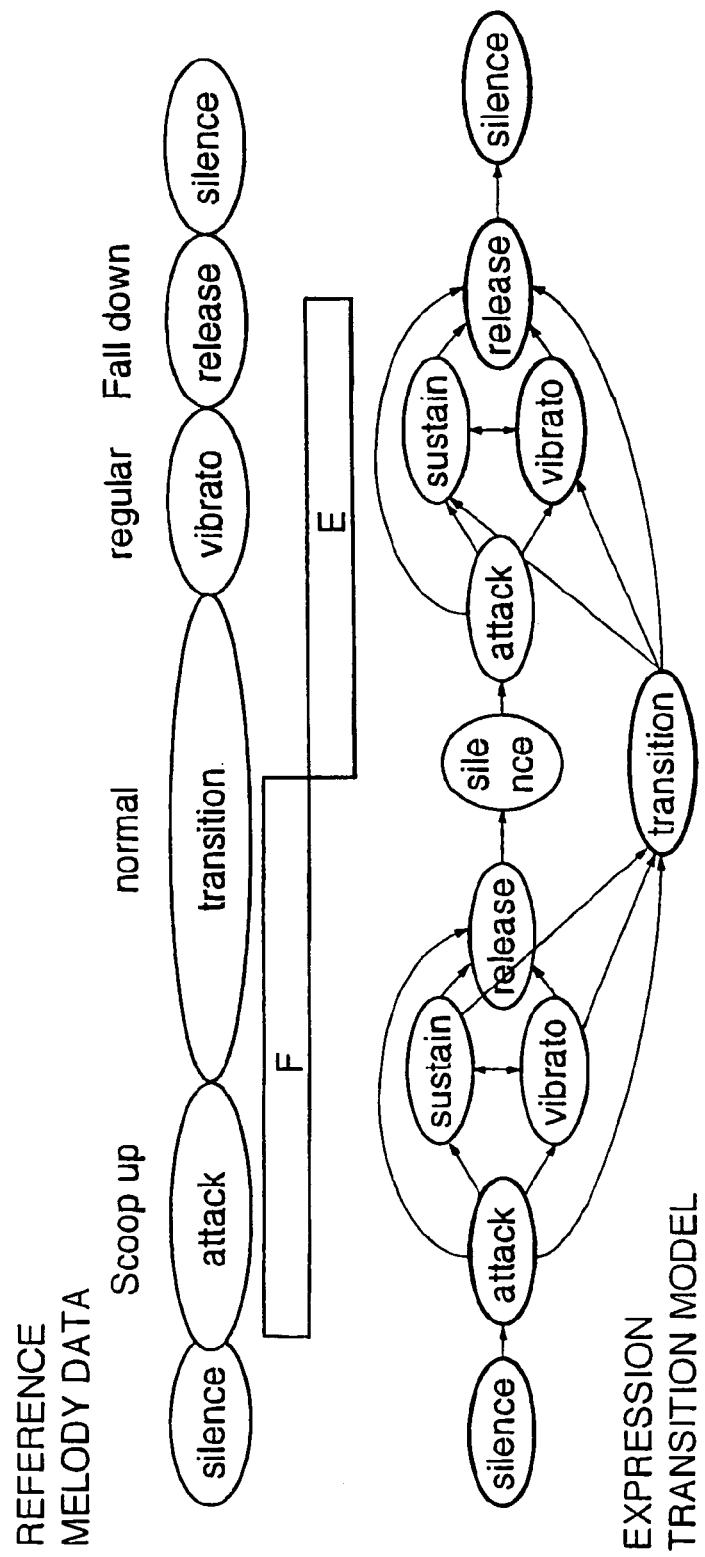
FIG. 5 is a diagram useful in explaining an expression determining process carried out by the karaoke machine with an expression transition model.

FIG. 5 is a diagram showing an example in which an expression transition route, silence→attack→transition→vibrato→release→silence, is selected as the route with the highest probability. It should be noted that FIG. 6 illustrates a state up to the transition in the form of a Viterbi matrix.

After the expression transition route is determined in the above described manner, a label with the highest possibility is determined with respect to each expression mode. The determination is carried out by calculation based on the heuristic rules described above.

In the upper part of FIG. 5, the exact times at which the final expression modes start and end are shown. The expression mode "attack" is labeled as "scoop-up", the transition as "normal", the vibrato as "regular", and the release as "fall down."

The expression determining process described above may be carried out with respect to an observed section of about two seconds, but may be carried out with respect to the entire musical composition after the performance thereof is completed.

In the expression determining process described above, it is preferred that operations described below are performed so as to determine expression modes in real time at intervals of two seconds and particularly while carrying out score matching in which actual transition points of tones (different from those in reference melody data) of singing sound are detected.

Specifically, a process "each time the beginning (or the end) of a given tone is determined by score matching, a route with the highest probability is determined with respect to the completed tone" is carried out.

The procedure of this process will now be described with reference to FIGS. 7 and 8.

In FIG. 7, a time at which a first tone of a reference melody is already known, but the duration (ending point) thereof is unknown, and hence the length of the first tone is unknown. It can be determined, however, only the first expression mode of this tone is "attack." This is because this tone is immediately after the first tone of a phrase, i.e. silence.

FIG. 8 illustrates a state at a time point where the beginning of a second tone in the reference melody is identified by score matching. In this state, a route with the highest probability is determined inside the range of the first tone. As a result, the following route (expression mode), attack (scoop-up)→vibrato (normal)→transition, is determined.

The duration and label of the transition, however, have not been determined yet. This is because the ending point of the transition is determined in the range of a subsequent tone. Thus, after the duration of the subsequent tone is determined by score matching, the duration (ending point) and label of transition are determined.

As described above, since expression modes are not determined with respect to all the sections within an observed section of about two seconds, but expression modes are sequentially determined with respect to tones of which durations have been determined by score matching, expression modes can be determined in real time and with higher accuracy.

As described above, according to the present embodiment, first, expression transition models are generated from reference melody information. Characteristic parameters such as pitch, volume, and degree of change in spectrum are sequentially detected from input musical tones. The probability that expression transition takes place and the probability that expression remains the same without making a transition are calculated from those values under predetermined rules. Based on the calculated probabilities, an expression transition route with the highest probability is selected from the expression transition models. The expression modes and the positions at which expression transition takes place (the lengths of sections) are determined, and the characteristic trends of respective expression modes are labeled. Therefore, expression modes and expression transitions of a song or performance can be correctly detected from an input sound signal. As a result, a karaoke machine can correctly score singing.

Also, streaming can be realized since the structure of data is such that the probability calculation results of sections in which expression modes and durations thereof have been determined are sequentially discarded. As a result, expression modes and expression transitions of singing or performance can be detected from an input sound signal in real time and with higher accuracy.

Although in the present embodiment, the sound signal processing apparatus is applied to the karaoke machine 1, but the present invention is not limited to this. The present invention may be applied to any apparatuses insofar as they can determine the expressions of input performance sounds. Also, sounds to be input are not limited to singing sounds but may be performance tones produced by performance of a musical instrument.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program code may be downloaded via a network.

Further, it is to be understood that the functions of the above described embodiment may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

In this case, the program may be supplied directly from a storage medium storing the program, or by downloading from another computer, a database, or the like, not shown, connected to the Internet, a commercial network, a local area network, or the like.

What is claimed is:

1. A sound signal expression mode determining apparatus comprising:
    a sound signal input device that inputs a sound signal produced by performance or singing of musical tones;
    a characteristic parameter detecting device that divides the input sound signal into frames of predetermined time periods and detects characteristic parameters of the input sound signal with respect to each frame;
    a reference data storing device that stores reference data in which a plurality of pieces of musical tone information, including a timing of starting and ending each of musical tones of a musical composition, are arranged in time series order;
    a state transition model generating device that generates a state transition model with respect to each of the musical tones of the plurality of pieces of musical tone information in the reference data; and
    a sound signal expression mode determining device that carries out a sound signal expression mode determining process in which i) a plurality of expression modes of a performance or song are modeled as respective states, ii) a probability that a section including a frame or a plurality of continuous frames lies in a specific state is calculated with respect to a predetermined observed section based on the characteristic parameters of the frames, and iii) a transition route for which the probability is the greatest is retrieved from among transition routes of the respective modeled states in the predetermined observed section based on the calculated probabilities, thereafter based on which transition route iv) expression modes of the sound signal are determined as being one of the states of silence, attack, sustain, vibrato or release, and v) the respective sections for which the expression modes of the sound signal are to be determined are identified based on transition points of the respective modeled states in the retrieved transition route, wherein the retrieved transition route indicates how the states of the expression modes change in each of the musical tones over time.

2. A sound signal expression mode determining apparatus according to claim 1, wherein in the sound signal expression mode determining process, said sound signal expression mode determining device further determines detailed contents of the expression modes based on the characteristic parameters with respect to sections in which the expression modes have been determined.

3. A sound signal expression mode determining apparatus according to claim 1, including a buffer that stores the characteristic parameters detected by said characteristic parameter detecting device, wherein said sound signal expression mode determining device carries out the sound signal expression mode determining process with respect to part of a musical composition during performance of the musical composition, and said buffer has a storage capacity for storing the part of the musical composition.

4. A sound signal expression mode determining apparatus according to claim 3, wherein said sound signal expression mode determining device detects transition points of the musical tones in the input sound signal and carries out the sound signal expression mode determining process at the transition points.

5. A sound signal expression mode determining apparatus according to claim 1, wherein said sound signal expression mode determining device determines the transition route on which the probability is the greatest using a Viterbi algorithm.

6. A method for determining a sound signal expression mode, the method comprising:
    inputting a sound signal produced by performance or singing of musical tones;
    dividing the sound signal into frames of predetermined time periods and detecting characteristic parameters of the sound signal with respect to each frame;
    storing reference data in which a plurality of pieces of musical tone information, including a timing of starting and ending of musical tones of a musical composition, are arranged in time series order;
    generating a state transition model with respect to each of the musical tones of the plurality of pieces of musical tone information in the reference data;
    modeling a plurality of expression modes of a performance or song as respective states;
    calculating a probability that a section, which includes a frame or a plurality of frames, lies in a specific state with respect to a predetermined observed section based on the characteristic parameters of the frames;
    retrieving, from among transition routes of the respective modeled states in the predetermined observed section, a transition route for which the probability is greatest based on the calculated probabilities; and
    based on which transition route, determining expression modes of the sound signals as being one of the states of silence, attack, sustain, vibrato or release, and identifying the respective sections for which the expression modes of the sound signals are to be determined based on transition points of the respective modeled states in the retrieved transition route, wherein the retrieved transition route indicates how the states of the expression modes change in each of the musical tones over time.

7. A program storage medium for storing a program which determines a sound signal expression mode, the program, when executed by a computer, causing:
  inputting a sound signal produced by performance or singing of musical tones;
  dividing the sound signal into frames of predetermined time periods and detecting characteristic parameters of the sound signal with respect to each frame;
  storing reference data in which a plurality of pieces of musical tone information, including a timing of starting and ending of musical tones of a musical composition, are arranged in time series order;
  generating a state transition model with respect to each of the musical tones of the plurality of pieces of musical tone information in the reference data;
  modeling a plurality of expression modes of a performance or song as respective states;
  calculating a probability that a section, which includes a frame or a plurality of frames, lies in a specific state with respect to a predetermined observed section based on the characteristic parameters of the frames;
  retrieving, from among transition routes of the respective modeled states in the predetermined observed section, a transition route for which the probability is greatest based on the calculated probabilities; and
  based on which transition route, determining expression modes of the sound signals as being one of the states of silence, attack, sustain, vibrato or release, and identifying the respective sections for which the expression modes of the sound signals are to be determined based on transition points of the respective modeled states in the retrieved transition route, wherein the retrieved transition route indicates how the states of the expression modes change in each of the musical tones over time.

\* \* \* \* \*